Figure 1:
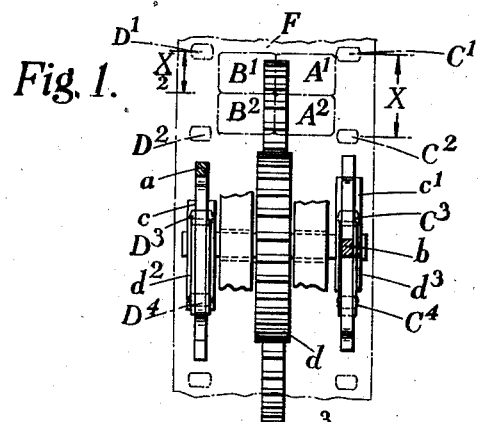

Nov. 15, 1938.   H. F. ALBRECHT ET AL   2,136,930
CLAW FEED MECHANISM FOR MOTION PICTURE APPARATUS
Filed Sept. 10, 1935   4 Sheets-Sheet 1

INVENTORS:
Herman Friedrich Albrecht
& Leslie Ernest Thomas Branch,
BY
ATTORNEYS Nov. 15, 1938.   H. F. ALBRECHT ET AL   2,136,930
CLAW FEED MECHANISM FOR MOTION PICTURE APPARATUS
Filed Sept. 10, 1935   4 Sheets-Sheet 4

INVENTORS:
Hermann Friedrich Albrecht &
Leslie Ernest Thomas Branch,
BY
ATTORNEYS.

Patented Nov. 15, 1938

2,136,930

UNITED STATES PATENT OFFICE 2,136,930

CLAW FEED MECHANISM FOR MOTION PICTURE APPARATUS

Hermann Friedrich Albrecht, Berlin-Friedrichshagen, Germany, and Leslie Ernest Thomas Branch, London, England, assignors, by mesne assignments, to Eastman Kodak Company, Jersey City, N. J., a corporation of New Jersey Application September 10, 1935, Serial No. 39,956
In Great Britain August 2, 1935

6 Claims. (Cl. 88—18.4)

This invention relates to claw feed mechanism for intermittently feeding motion picture film past the exposure aperture or objective of motion picture cameras or projectors.

According to the present invention the film is alternately engaged at two levels and is fed forward by each engagement through a distance equal to the height of an image area, the two levels at which the film is engaged being spaced apart by the said distance or an odd multiple thereof.

The invention is particularly, though not exclusively, applicable for the exposure or projection of film upon which a plurality of images of reduced size are to be or have been recorded on the "normal image area" so that each reduced image area has a height as measured in the direction of the length of the film, which is equal to half the height of the "normal image area", that is to say the area extending throughout the width of the picture area of the film and whose height usually corresponds to the spacing of the perforations in the film.

To this end the distance through which the film is fed forward at each of the said alternate engagements may be half the height of a normal image area. In this way only the perforations spaced in accordance with the height of the normal image area are employed and the necessity for providing double the number of perforations per unit of length of the film, is obviated so that standard film stock can be employed.

Claw feed mechanism according to the invention comprises claw mechanism driven so that the claw will engage the film at two levels alternately, and, by each engagement, will feed the film forward through a distance equal to the height of an image area, the two levels at which the film is engaged being spaced apart by the said distance or an odd multiple thereof.

When the mechanism is to be employed in a camera or projector for exposing or projecting film upon each normal image area of which a plurality of images of reduced size are to be or have been recorded as above indicated, the claw mechanism is so driven that the film is fed forward at each engagement by a distance equal to half the height of a normal picture area.

The claw mechanism may comprise a single pull-down claw member which is driven so as to engage the film alternately at the said two levels, whereby each perforation in the film is engaged by the claw twice in succession. In another arrangement the claw mechanism may comprise two pull-down claw members driven so as to engage the film alternately at the two levels, the two claw members cooperating with one and the same row of perforations or with two rows of perforations in the film.

In the accompanying drawings—

Figure 2:
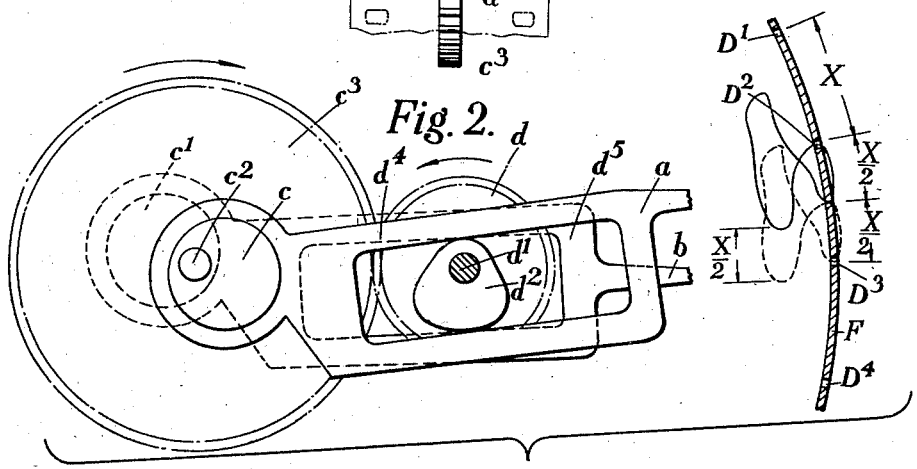
Figure 3:
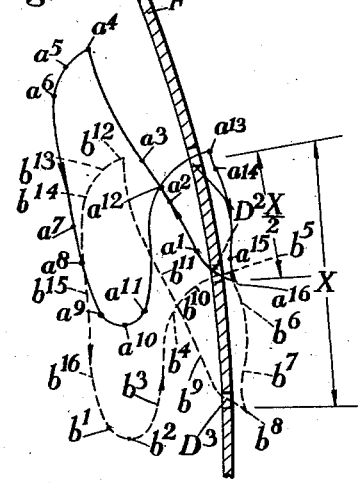
Figure 4:
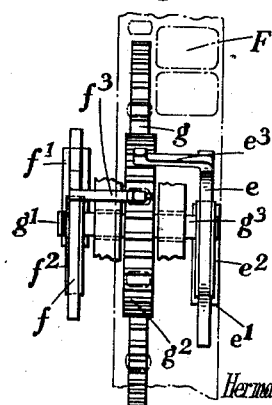
Figure 5:
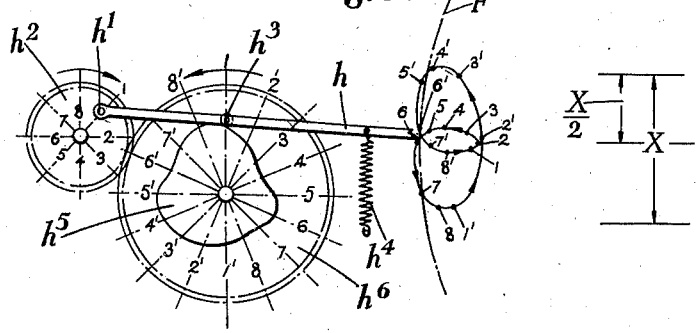
Figure 6:
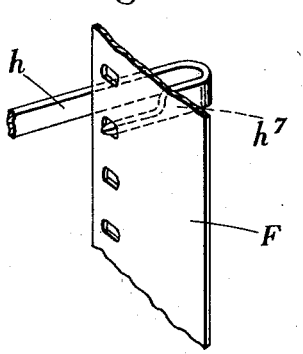
Figure 8:
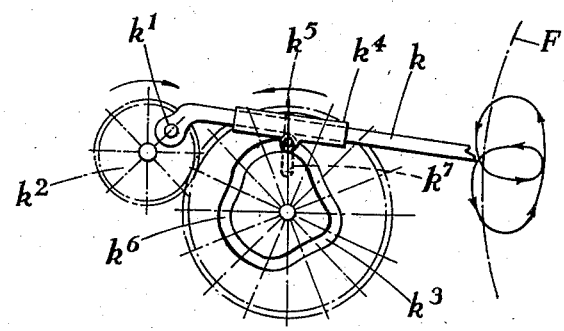
Figure 9:
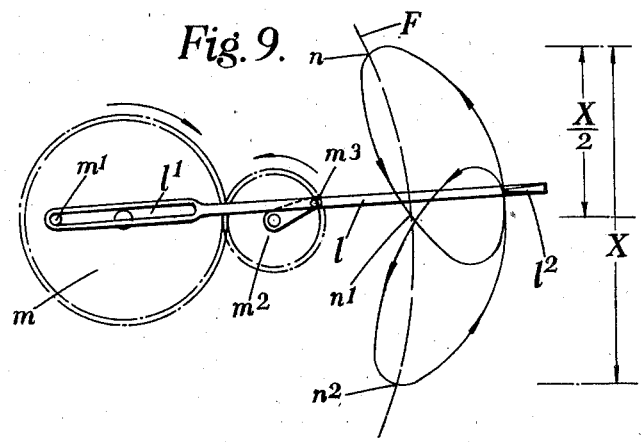
Figure 10:
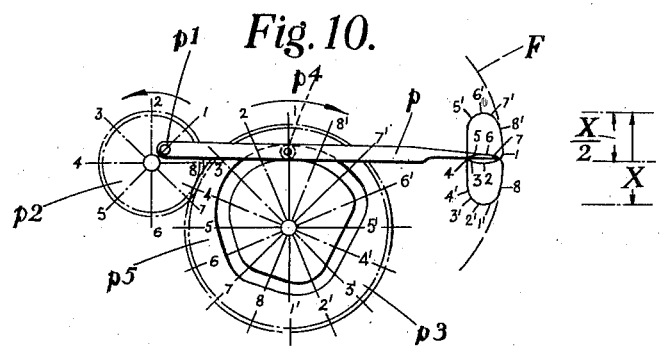
Figure 11:
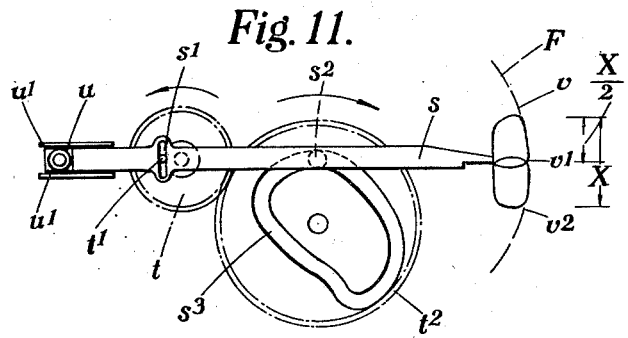
Figure 12:
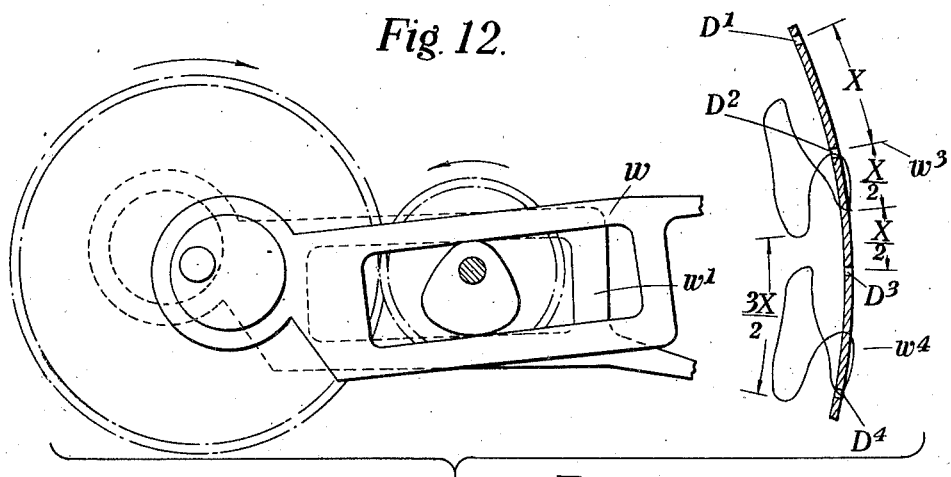
Figure 13:
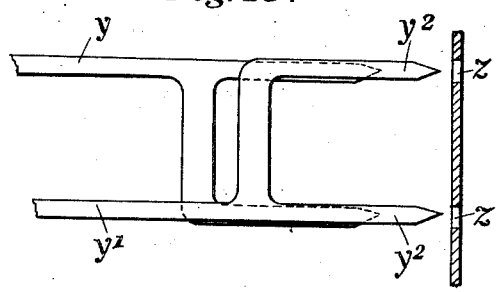

Figures 1 and 2 illustrate one arrangement of claw feed mechanism according to the invention, Figure 1 being a view from that end adjacent to the film and Figure 2 a side elevation, Figure 3 shows on an enlarged scale the paths followed by the two pull-down claws, Figure 4 is a view similar to that of Figure 1, with the pull-down claws modified to cooperate with one and the same row of perforations in the film, Figure 5 diagrammatically illustrates a further arrangement according to the invention and employing a single pull-down claw, Figure 6 is a perspective, on an enlarged scale, of the pull-down claw employed in Figure 5, Figures 7, 8 and 9 show three further constructions, Figures 10 and 11 illustrate diagrammatically two further constructions also according to the invention, Figure 12 illustrates an arrangement which is a modification of that shown in Figure 2, and Figure 13 shows double tined claw members which may be employed in arrangements such as those shown in Figures 2 and 12.

The construction illustrated in Figures 1 and 2 is intended for cameras or projectors employing a film F upon which two rows of images are to be or have been recorded, four images being recorded on each normal image area so that each of the said four image areas is half the height of the said normal image area. Thus, as shown in Figure 1, the normal image area having the height X has or is to have four images recorded thereon, the images $A^1$, $A^2$ being comprised in one longitudinal row and the images $B^1$, $B^2$ comprised in the other longitudinal row, each of these four images having a height $X/2$. The images in one row may be recorded so as to be inverted relatively to those in the other row with a view to longitudinal division of the film and joining of the two lengths to form a single record. As will be seen the film is furnished with perforations $C^1$, $C^2$, $C^3$, $C^4$ along one margin and perforation $D^1$, $D^2$, $D^3$, $D^4$ along the other margin, these perforations being spaced apart by a distance equal to the height of the normal image area.

Since each image area $A^1$, $A^2$, $B^1$, $B^2$ has half the height of the normal image area each forward movement of the film must be equal to the said height, namely, X/2. To effect this feed with normally spaced perforations the claw feed mechanism shown in Figures 1 and 2 comprises two claw members $a$ and $b$ which are driven by mechanism generally similar to that described in the specification of the United States of America Patent No. 1,900,876. Thus, the claws are reciprocated by two eccentrics $c$ and $c^1$ respectively, both eccentrics being mounted on a shaft $c^2$ driven by a gear wheel $c^3$ meshing with a gear wheel $d$ to which the drive is transmitted from a motor (not shown). The diameter of the gear wheel $c^3$ is double that of the gear wheel $d$, which is secured to a shaft $d^1$ carrying two cams $d^2$, $d^3$ cooperating respectively with frames $d^4$, $d^5$ formed integral with the claw members $a$ and $b$. The eccentrics $c$, $c^1$ thus impart reciprocating motion to the claw members $a$ and $b$ whilst swinging motion transverse to the said reciprocation is imparted to the claws $a$ and $b$ by the cams $d^2$ and $d^3$. The cams $d^2$ and $d^3$ are in phase whereas the eccentrics $c^1$ and $c^2$ are 180° out of phase as clearly shown in Figure 2. The claw members $a$ and $b$ are thus caused to follow the paths shown respectively in full lines and in dotted lines in Figures 2 and 3, the operative part of the claw $b$ at any point on the path thereof lying a distance X/2 below the corresponding point on the path followed by the operative part of the claw $a$, as indicated in Figure 2.

With the parts in the positions shown in Figure 2 the operative part of the claw $a$ lies in the position $a^1$ (Figure 3) whilst the operative part of the claw $b$ lies in the position $b^1$, i. e. the claws are 180° out of phase, with the claw $a$ moving upwards, having just engaged and moved the perforation $D^2$ from the level shown in full lines to the level shown dotted, whilst the claw $b$ is in the position $b^1$, that is to say about to turn and travel upwards towards the new position of the perforation $C^2$. The positions $b^2$, $b^3$ and $b^4$ of the claw $b$ correspond respectively to the positions $a^2$, $a^3$ and $a^4$ of the claw $a$ so that the claw $b$ moves into the perforation $C^2$ in its new position as the claw $a$ moves from $a^4$ to $a^5$. The claw $b$ now moves downwards from $b^5$ through $b^6$ and $b^7$ to $b^8$ as the claw $a$ moves down from $a^5$ through $a^7$ to $a^8$ so that the perforation $C^2$ now lies in the position originally occupied by the perforation $C^3$. As the claw $b$ moves out from the position $b^8$ through the positions $b^9$, $b^{10}$ and $b^{11}$ to $b^{12}$ the claw $a$ moves from $a^8$ through the positions $a^9$, $a^{10}$ and $a^{11}$ to the position $a^{12}$. The claw $a$ now engages the perforation $D^1$ which has been moved from the position shown to the position originally occupied by the perforation $D^2$. As the claw $a$ moves from $a^{13}$ through $a^{14}$ and $a^{15}$ to the position $a^{16}$ the claw $b$ moves from $b^{12}$ through $b^{13}$, $b^{14}$ and $b^{15}$ to $b^{16}$ after which the cycle is repeated.

It will therefore be seen that the claw $a$ first engages a perforation in the corresponding margin of the film at the level $a^{13}$, moves the film forward to a lower level $a^{16}$, i. e. through the distance X/2, after which the claw $b$ engages the corresponding perforation in the other margin of the film at the said lower level and moves it to the level $b^8$, that is to say through another distance equal to X/2.

The modified construction illustrated in Figure 4 is suitable for feeding a film having a single row of perforations either extending along one margin of the film, as when a film after having two rows of images recorded thereon has been divided longitudinally, or a row of perforations extending down the centre of the film. The mechanism shown in Figure 4 is generally similar to that described with reference to Figures 1, 2 and 3, two frame-like claw members $e$, $f$ being reciprocated by eccentrics $e^1$, $f^1$ mounted on a shaft $g^1$ driven by a gear wheel $g$ which meshes with a gear wheel $g^2$. The gear wheel $g^2$, whose speed of rotation is double that of the gear wheel $g$, is driven by a motor (not shown) and is mounted on a shaft $g^3$ carrying two cams $e^2$, $f^2$ which respectively impart to the claw members $e$ and $f$ a swinging movement transverse to their reciprocating movement. The claw members $e$ and $f$ have their operative ends or claws $e^3$, $f^3$, bent inwards so as to lie in alignment and cooperate with the single row of marginal perforations in the film F. The paths followed by the claws $e^3$ and $f^3$ are the same as those described with reference to Figure 3, the eccentrics $e^1$, $f^1$ being of the order of 180° out of phase whilst the cams $e^2$, $f^2$ are in phase or nearly in phase.

The claw $e^3$ thus engages a perforation in the film, moves it down through a distance X/2 to a lower level at which the same perforation is then engaged by the claw $f^3$ and the film again moved down through the distance X/2.

Figure 5 illustrates another construction in which a claw member $h$ connected at one end to a crank pin $h^1$ on a gear wheel $h^2$ is furnished with a follower $h^3$ held by a spring $h^4$ in engagement with a cam $h^5$ carried by a gear wheel $h^6$. The gear wheel $h^6$ meshes with the gear wheel $h^2$ which is driven by a motor (not shown) in the direction of the arrow and has a rotational speed double that of the gear wheel $h^6$. The operative end of the claw $h$ is bent back as shown at $h^7$ in Figure 6 so that the claw enters the perforations in the film F from that side thereof remote from the feed mechanism.

With the parts in the positions shown the crank pin $h^1$ lies on the radial line 1 of the gear wheel $h^2$ and the follower $h^3$ engages the cam $h^5$ at a point where this is intersected by the radial line 1 on the gear wheel $h^6$. The numbers shown on the wheel $h^2$ are to be considered as fixed on the apparatus whilst the numbers on the wheel $h^6$ are to be considered as being on the wheel itself. The claw $h^7$ now lies in the position 1 on the path indicated. As the crank pin $h^1$ moves through the positions 2, 3 and 4 indicated on the gear wheel $h^2$ the follower $h^3$ passes over the points on the surface of the cam $h^5$ intersected by the radial lines 2, 3 and 4 respectively on the gear wheel $h^6$, the claw $h^7$ thus moving through the points 2, 3 and 4 on the path indicated. Movement of the crank pin through the positions 5, 6, 7 and 8 indicated on the gear wheel $h^2$ is accompanied by moving of the follower $h^3$ over the points of the cam $h^5$ intersected by the radial lines 5, 6, 7 and 8 indicated on the gear wheel $h^6$, the claw $h^7$ being thus caused to enter the film at 5 on the path shown and to move forward through the point 6 to the point 7 where it leaves the perforation in the film and continues idly to the point 8. When the crank pin $h^1$ again reaches the position 1 shown on the gear wheel $h^2$ the latter will have completed one revolution whilst the gear wheel $h^6$ will have rotated through half a revolution, the follower $h^3$ now lying on the part of the cam $h^5$ intersected by the radial line 1' on the gear wheeel $h^6$.

On further rotation of the gear wheel $h^2$ so as to move the crank pin $h^1$ from the position 1 on the gear wheel $h^2$ to the position 4 thereon, the follower $h^3$ will move from the point 1' on the cam $h^5$ to the point 4' thereon so that the claw $h^7$ moves upwards from the position 1', shown on the claw path, through the positions 2' and 3' to the position 4'. Completion of the second revolution of the gear wheel $h^2$, that is to say by moving the crank pin $h^1$ from the position 4 through the positions 5, 6 and 7 to the position 8 shown on the gear wheel $h^2$, will be accompanied by movement of the follower $h^3$ over the points 5', 6', and 7' to the point 8' on the cam $h^5$, the claw $h^7$ being thus moved from 4' shown on the path into engagement with a perforation in the film whereupon the claw moves through the positions 5', 6' and 7' to the position 8' shown on the path. The cycle is then repeated so that the claw $h^7$ enters, at the point 5 on the path, the perforation in the film which has been moved from the position 4' to the position 6'.

Figure 7:
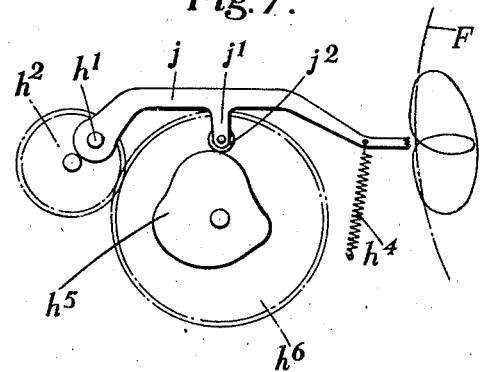

Figure 7 illustrates a construction similar to that shown in Figure 5 with the exception that the claw member is bent upwards as shown at $j$ and is furnished with a downwardly projecting arm $j^1$ carrying a follower roller $j^2$ which cooperates with the cam $h^5$.

A further construction of feed mechanism according to the invention is illustrated in Figure 8, this construction being similar to that described with reference to Figure 5 with the exception that the claw member can slide relatively to the follower which cooperates with the cam. In this construction the claw member $k$ is connected at one end to a crank pin $k^1$ carried by a gear wheel $k^2$ driven by a motor (not shown) and meshing with a gear wheel $k^3$ whose rotational speed is half that of the gear wheel $k^2$. The claw member $k$ is longitudinally slidable within a sleeve $k^4$ which carries a follower pin $k^5$ in engagement with a cam groove $k^6$. The pin $k^5$ is extended to engage and slide in a vertical slot $k^7$ formed in a plate or wall carried by a fixed part of the apparatus. The operative end of the claw member $k$ is bent back as illustrated in Figure 6 and follows the path indicated, that is to say as described with reference to Figure 5.

A modified construction of feed mechanism as illustrated in Figure 9 in which a claw member $l$ is furnished at one end with a longitudinal slot $l^1$ engaged by a crank pin $m^1$ carried by a gear wheel $m$ which meshes with a gear wheel $m^2$ driven by a motor not shown. The rotational speed of the gear wheel $m$ is half that of the gear wheel $m^2$ which carries a crank pin $m^3$ connected to a point in the length of the claw member $l$. The operative end of the claw member is bent back at $l^2$ in a manner similar to that described with reference to Figure 6. In this construction the reciprocating motion is transmitted to the claw member $l$ by the crank pin $m^3$ whilst the swinging motion in a direction transverse to the motion of reciprocation is imparted to the claw member $l$ by the crank pin $m^1$. As in the constructions described with reference to Figures 5, 7 and 8 the claw $l^2$ enters a perforation in the film at one level, indicated at $n$ in Figure 9, moves the film downwards through a distance equal to half the height of a normal image area and then leaves the said perforation at the lower level indicated at $n^1$. The claw $l^2$ then moves idly before reentering the perforation at $n^1$, and then moves the film forward a further distance equal to half the height of a normal image area, the claw leaving the said perforation at the point indicated at $n^2$ and then moving upwards so as to recommence the cycle by entering the perforation now lying at the original level $n$.

Yet another construction of feed mechanism is illustrated in Figure 10 in which a claw member $p$ is connected at one end to a crank pin $p^1$ carried by a gear wheel $p^2$ driven by a motor (not shown) and meshing with a gear wheel $p^3$ having a rotational speed half that of the gear wheel $p^2$. The claw member $p$ carries a follower $p^4$ which engages a cam slot $p^5$ on the gear wheel $p^3$. With the parts in the position shown in the drawing the operative part of the claw member $p$ lies in the position 1 on the path shown, the follower $p^4$ engaging the cam $p^5$ where this is intersected by the radial line 1 on the gear wheel $p^3$ whilst the crank pin $p^1$ lies on the radial line 1 on the gear wheel $p^2$. As the gear wheel $p^2$ rotates from the position indicated through the positions shown by the lines 2 and 3 to the position 4 the follower $p^4$ passes over the points of the cam $p^5$ intersected by the radial lines 2, 3 and 4 on the gear wheel $p^3$. The operative part of the claw $p$ now lies in the position 4 on the path indicated.

As the gear wheel $p^2$ continues to rotate the crank pin $p^1$ moves through the positions 5, 6, 7 and 8 whilst the follower $p^4$ moves over the points 5, 6, 7 and 8 on the cam $p^5$, the operative portion of the claw $p$ being thus moved inwards through the points 5, 6, 7 and then downwards to the point 8 shown on the path.

As the gear wheel $p^2$ rotates from the position 8 through the positions 1, 2 and 3 to the position 4, the follower $p^4$ moves over the points 1', 2' and 3' to the point 4' on the cam $p^5$ whereby the operative portion of the claw $p$ is moved outwards with respect to the film through the points 1', 2' and 3' to the point 4' shown on the path. As the gear wheel $p^2$ completes its second revolution, that is to say by rotating the crank pin $p^1$ through the positions 5, 6, 7 and 8 back to the position 1, the follower $p^4$ moves over the points 5', 6', 7' and 8' to the point 1 the operative portion of the claw $p$ being thus moved rapidly upwards from the point 4' to the point 5' shown on the path and thence inwards through the point 6' to enter a perforation in the film at the point 7' and move the film forward through the point 8' to the original position 1.

With the apparatus shown in Figure 10 therefore the claw $p$ first enters a perforation at the level 7' shown on the film path, moves the film forward by a distance equal to half the height of a normal image area and then leaves the perforation at the level 1 shown on the path. The claw then describes the central loop before reengaging the same perforation and moving the film another step forward equal to half the height of a normal image area. The claw leaves the perforation at the point 1' shown on the path and moves upwards so as to enter a new perforation which has been positioned at the level 7'.

Figure 11 illustrates a construction which is a modification of that described with reference to Figure 10 and comprises a claw member $s$ having a transverse slot $s^1$ engaged by a crank pin $t^1$ carried by a gear wheel $t$ which is driven by a motor (not shown) and meshes with a gear wheel $t^2$, the gear wheel $t^2$ having a rotational speed which is half that of the gear wheel $t$. The slot $s^1$ is of sufficient length to allow free movement of the crank pin $t^1$ as the wheel $t$ revolves. That end of the claw member $s$ adjacent to the crank pin $t^1$ is connected to a cross-head $u$ which slides in guides $u^1$. A follower pin $s^2$ carried by the claw member $s$ engages a cam groove $s^3$ on the gear wheel $t^2$. As in the construction described with reference to Figure 10 the operative end of the claw member $p$ first engages a perforation in the film at one level, indicated at $v$ and then moves the film forward through a distance equal to half the height of a normal image area, the claw leaving the said perforation at the level $v^1$. The claw then describes the central loop before reengaging the same perforation at the level $v^1$ and again moving the film forward through a distance equal to half the height of a normal image area. The claw leaves this perforation at $v^2$ and thereupon moves upwards so as to engage a new perforation which has been positioned at the level $v$.

The method of arriving at the contour of each of the cams included in Figures 5, 7, 8, 10 and 11 is, briefly, as follows:— Draw the required film claw path and mark it at sixteen approximately equal time intervals (1 to 8 and 1' to 8'). The distance between the front downward paths and the rear upward path with respect to the film then gives, approximately, the diameter of the circular path required for the pin $h^1$, $k^1$, $m^1$, $p^1$ or $t^1$ in Figures 5 and 7, or Figure 8, or Figure 9 or Figure 10 or Figure 11. The two gear wheels are then turned through each of the angular distances indicated thereon and the operative end of an imaginary claw member is simultaneously placed successively on the points marked on the claw path. The distance between the claw member and the centre of the large gear wheel for each successive position of the claw is then marked on the corresponding radial line shown on the large gear wheel. A line joining these points together then gives the contour and position of the cam. Though in each of Figures 5, 7, 8, 9, 10 and 11, illustrating simple claw mechanisms, the exposure times are approximately equal for each half cycle of the claw, arrangements may be employed in which the exposure times are not equal provided that the apparatus is furnished with means, such for example as suitable shutter mechanism, whereby the exposure times are, in effect, equalized or approximately equalized.

Though in the constructions described above each perforation in the film is engaged twice in succession by causing engagement to take place at levels spaced apart by a distance equal to half the height of a normal picture area the feed mechanism may be so arranged that the levels are spaced apart by an odd multiple of the said distance so that though each perforation is engaged twice these engagements are not successive. Thus, as illustrated for example in Figure 12, two claw members $w$, $w^1$ driven as described with reference to Figure 2, are so constructed that any two corresponding points in the paths followed by the claws are spaced apart by a distance $$\frac{3x}{2},$$

i. e. three times the distance $$\frac{x}{2}$$

through which the film is advanced at each engagement. When therefore the claw member $w$ has engaged the perforation $D^2$ at the level $w^3$ and fed the film forward through the distance $$\frac{x}{2}$$

the claw member $w^1$ enters the perforation $D^3$, which now lies at the level $w^4$, and feeds the film forward through the distance $$\frac{x}{2}$$

Each claw member in any of the constructions above described may be furnished with two tines or claws as illustrated, for example, in Figure 13. In this construction each of the two claw members $y$ and $y^1$, which are suitable for the construction shown in Figure 2 or Figure 12, is provided with two tines $y^2$ spaced apart a distance equal to that between two rows of perforations $z$ in the film.

It will be understood that the constructions above described are given by way of example only and that the invention may be carried into practice in various other ways. Thus, the form of cam employed and the form of claw as also the driving mechanism associated therewith may vary widely to suit requirements.

It will be appreciated that whilst the invention is particularly applicable to the feeding of film upon which each image area has a height less than that of the normal image area, the invention may also be employed to feed film having picture areas of normal dimensions provided that the forward movement effected by each claw is equal to the height of the said image area.

What we claim as our invention and desire to secure by Letters Patent is:—

1. In a film advancing mechanism for feeding a film which is provided with perforations longitudinally spaced at a definite pitch, the combination with a pair of link members each including a claw for entering said film perforations and engaging said film, of a pair of actuating members operatively connected to respective link members and for alternatively reciprocating said link members into and out of said film perforations, and a second pair of actuating members also operatively connected to respective link members, each for advancing the associated claw a distance of one-half the film pitch, and each located with respect to each other and to the corresponding one of the first mentioned pair of actuating members so that one claw is advanced to move the film for a distance of one-half the film pitch during its engagement with the film and the other claw is advanced to move the film for a distance of the other half of the film pitch during its engagement with the film.

2. In a film advancing mechanism for feeding a film which is provided with perforations longitudinally spaced at a definite pitch, the combination with a pair of link members each including a claw for entering said film perforations and engaging said film, of a pair of eccentric members co-axially mounted with their eccentricities extending in opposite directions and for alternatively reciprocating said link members into and out of said film perforations, a pair of cam members operatively connected to respective link members and co-axially mounted, each cam member having an actuating portion angularly displaced with respect to the actuating portion on the other cam and which is formed so as to move the respective claw for advancing the film a distance of one-half the film pitch, and a geared connection between the pair of eccentric members and the pair of cam members and for timing the periods of film advancement to take place while the respective claws are in engagement with the film.

3. In a film advancing mechanism for feeding a film which is provided with perforations longitudinally spaced at a definite pitch, the combination with a pair of link members each including a claw for entering said film perforations and engaging said film, of a pair of eccentric members co-axially mounted with their eccentricities angularly displaced by 180° and for alternatively reciprocating said link members into and out of said film perforations, a pair of triangular cams operatively connected to respective link members and co-axially mounted, each cam member having an actuating portion angularly displaced by 180° from the actuating portion on the other cam and which actuating portions are formed so as to move the respective claw for advancing the film a distance of one-half the film pitch, and a geared connection between the pair of eccentric members and the pair of cam members and for timing the periods of film advancement to take place while one claw is in engagement and the other claw is out of engagement with the film.

4. In a film advancing mechanism for feeding a film which is provided with perforations longitudinally spaced at a definite pitch, the combination with a pair of link members each including a claw for entering said film perforations and engaging said film, of a pair of actuating members operatively connected to respective link members and each having a portion for moving said claw to advance the film a distance of one-half of the film pitch, and a pair of eccentric members each operatively connected to a link member for reciprocating the respective claws of said link members into and out of said film perforations and each angularly displaced with respect to each other so that during movement of one claw toward and into engagement with the film, the other claw is being moved away from and out of engagement with the film.

5. In a film advancing mechanism for feeding a film which is provided with perforations longitudinally spaced at a definite pitch, the combination with a pair of link members each including a claw for entering said film perforations and engaging said film, of a pair of actuating members operatively connected to respective link members and each having a portion for moving said claw to advance the film a distance of one-half of the film pitch, and a pair of eccentric members each operatively connected to a link member for reciprocating the respective claws of said link members into and out of said film perforations and each angularly displaced with respect to each other so that during movement of one claw toward and into engagement with the film the other claw is being moved away from and out of engagement with the film, said link members being supported by said eccentric and actuating members so that the entering claw moves into one of a pair of perforations which is longitudinally successive to the perforation being left by the other claw.

6. In a film advancing mechanism for feeding a film which is provided with perforations longitudinally spaced at a definite pitch, the combination with a pair of link members each including a claw for entering said film perforations and engaging said film, of a pair of actuating members operatively connected to respective link members and each having a portion for moving said claw to advance the film a distance of one-half of the film pitch, and a pair of eccentric members each operatively connected to a link member for reciprocating the respective claws of said link members into and out of said film perforations and each angularly displaced with respect to each other so that during movement of one claw toward and into engagement with the film the other claw is being moved away from and out of engagement with the film, said link members being so formed and being so supported by said eccentric members and said actuating members that the entering claw moves into a perforation longitudinally spaced at a distance equal to an odd multiple of the half film pitch from the perforation being left by the other claw.

HERMANN FRIEDRICH ALBRECHT.
LESLIE ERNEST THOMAS BRANCH.